United States Patent [19]

Daniel et al.

[11] 4,294,704

[45] Oct. 13, 1981

[54] PROCESS FOR THE MANUFACTURE OF PRINTING PAPER AND BOARD

[75] Inventors: Jean-Claude Daniel, Fontenay-Sous-Bois; Jacques Grossoleil, Pairs; Robert Roullet, Lyon, all of France

[73] Assignee: Rhone-Poulenc Industries, Paris, France

[21] Appl. No.: 135,239

[22] Filed: Mar. 31, 1980

Related U.S. Application Data

[63] Continuation of Ser. No. 898,953, Apr. 21, 1978, abandoned.

[30] Foreign Application Priority Data

Apr. 22, 1977 [FR] France .............................. 77 12159

[51] Int. Cl.³ .................. B01D 13/00; C02F 1/44
[52] U.S. Cl. .................. 210/651; 427/361; 427/391; 428/513; 428/514; 428/537
[58] Field of Search ............. 427/146, 361, 391, 445; 210/23 F, 651; 428/511, 512, 513, 537, 539, 326, 327, 514; 528/499, 502; 260/29.6 PT

[56] References Cited

U.S. PATENT DOCUMENTS

| | | | |
|---|---|---|---|
| 2,772,184 | 11/1956 | Wolfe et al. | 427/391 |
| 3,046,259 | 7/1962 | Hess et al. | 528/502 |
| 3,511,799 | 5/1970 | Clampitt | 260/29.6 PT |
| 3,531,448 | 9/1970 | Johnson | 528/502 |
| 3,578,493 | 5/1971 | Smith | 427/391 |
| 3,920,592 | 11/1975 | Dykstra et al. | 427/391 |
| 3,944,513 | 3/1976 | Greenwald et al. | 260/29.6 PT |
| 4,010,307 | 3/1977 | Canard et al. | 427/391 |
| 4,064,304 | 12/1977 | Fujita et al. | 427/391 |
| 4,069,188 | 1/1978 | Canard et al. | 428/511 |
| 4,082,659 | 4/1978 | Heinze et al. | 528/487 |

FOREIGN PATENT DOCUMENTS

1131013 12/1960 Fed. Rep. of Germany ..... 260/29.6 PT

Primary Examiner—Ronald H. Smith
Assistant Examiner—S. L. Childs
Attorney, Agent, or Firm—McDougall, Hersh & Scott

[57] ABSTRACT

Aqueous latex base binder of a synthetic polymer for preparing aqueous compositions for coating paper and board for printing, having improved wet and dry tear strength. The content in the latex of hydrosoluble compounds dissolved in the aqueous phase is less than 0.5% by weight in relation to the polymer.

5 Claims, 1 Drawing Figure

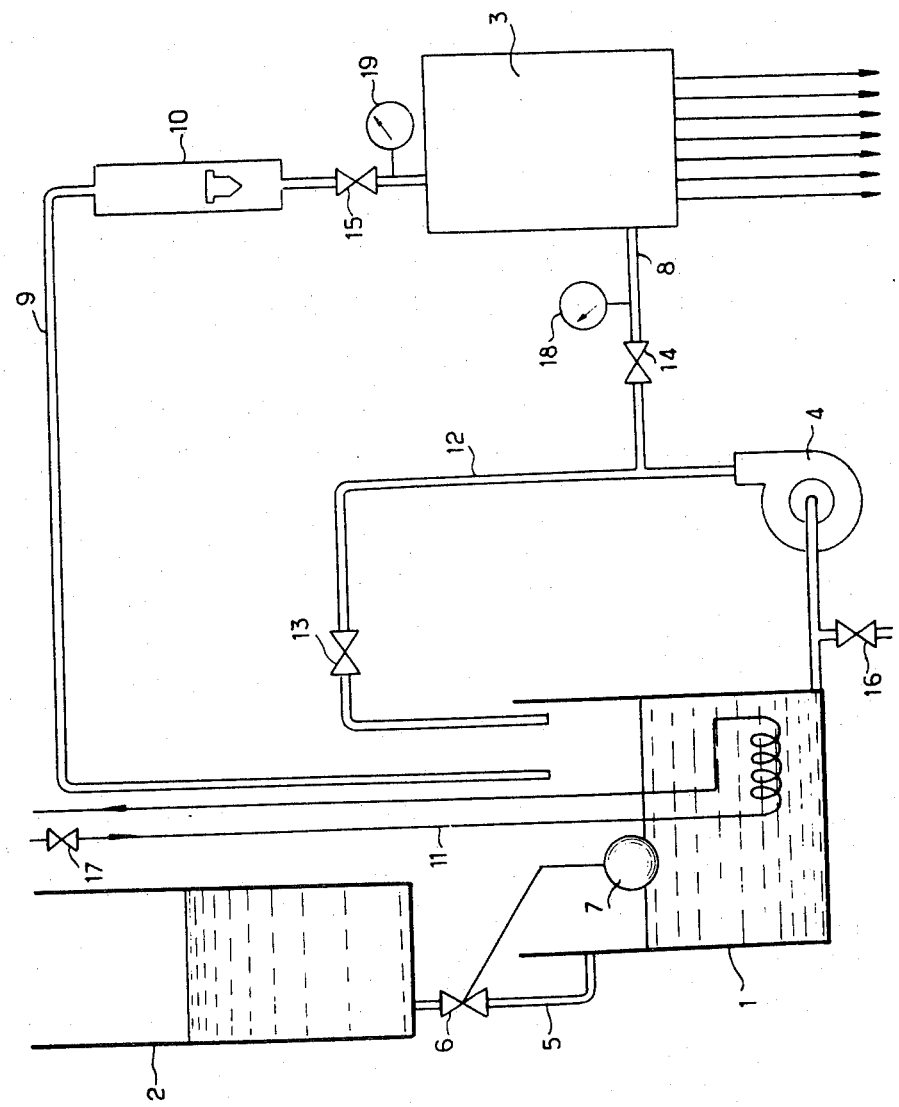

PROCESS FOR THE MANUFACTURE OF PRINTING PAPER AND BOARD

This is a continuation, of application Ser. No. 898,953, filed Apr. 21, 1978 now abandoned.

The present invention relates to an aqueous latex base binder of a synthetic latex for the preparation of aqueous compositions for coating paper and board for printing. It also pertains to the aqueous compositions containing the aforementioned binder and the paper and board coated by means of the aforementioned compositions.

It is known that, in principle, the aqueous compositions for coating paper and board consist of pigments and binders. The most often used pigment is mineral clay. Other pigments such as calcium carbonate, titanium oxide, hydrargillite, talc and barium sulfate are also used in low proportions with respect to the mineral clay. These pigments are dispersed in water, generally in an alkaline medium and in the presence of dispersing agents, the major ones being tetrasodium pyrophosphate, sodium hexametaphosphate, low-molecular-weight polyacrylates, employed in ratios between 0.2 and 0.5% by weight with respect to the pigments. The pigments are fixed to the paper or board by means of binders. The binders are generally aqueous latexes of a synthetic polymer, such as a styrene-butadiene copolymer, carboxylated styrene-butadiene copolymer, acrylic polymer or vinyl acetate polymer, used either alone or mixed with natural binders such as starches, proteins, casein or with synthetic binders such as polyvinyl alcohols. It is also possible to add to the latexes, products such as carboxymethylcelluloses or alginates, which can improve the water retention properties of the coating compositions.

Finally, the coating compositions may also contain various other ingredients such as cross-linking agents, anti-foaming agents, lubricating agents, optical brighteners and colorants.

Coating paper and board with aqueous compositions is accomplished by means of a machine coater, employing various techniques which use various devices among which the following, known industrially under the following trade names, can be cited: air-doctor coater, size-press, Champion coater, Massey coater, trailing-blade coater. After coating the paper or board, the coating is dried.

The properties desired for the coated paper and board vary according to the printing method for which they are intended, the major ones being gravure and offset printing. The more viscous the printing ink, the higher must be the dry tear-resistance of the paper, which is a function of how well the coating adheres to the support. In addition, in four color offset printing, one is led to print the second, third or fourth color on a previously wet area. Therefore, to avoid tearing when wet, which would result in dirtying the blanket and the offset presses, it is necessary for the paper or board to have adequate wet tear-resistance. To obtain the dry and wet tear-resistance levels required by the printing process, it is desirable to use the minimum amount of binder because, very generally speaking, the higher the proportion of binder used, the more the whiteness and brightness, i.e., the optical properties specifically provided by the pigment, are degraded.

Among the synthetic polymer latexes used as binders, those which have the highest binding power are therefore the most desirable in that, since they can be used in the lowest possible proportion, maximum whiteness and brightness can be obtained.

The binders of the invention have an aqueous latex base of a synthetic polymer, and the content in hydrosoluble compounds dissolved in the aqueous phase being less than 0.5% by weight in relation to the polymer.

Hydrosoluble compounds primarily include, for example, salts formed by catalytic residues, surface-active agents and macromolecular compounds such as carboxyl compounds.

The applicant has found that, all things being equal in other respects, latexes with a sufficiently low content of hydrosoluble compounds dissolved in the aqueous phase have an improved binding power.

The following can be cited as synthetic polymers usable as latexes according to the invention: styrene-butadiene copolymers, carboxyl styrene-butadiene copolymers, vinyl polyacetates, carboxyl vinyl polyacetates, alkyl acrylate-vinyl acetate copolymers, carboxyl alkyl acrylate-vinyl acetate copolymers.

The content in the latex of hydrosoluble compounds dissolved in the aqueous phase can be estimated by using the method hereinafter described in which semipermeable membranes with high cutoff are used which permit low-molecular-weight compounds or if need be carboxyl macromolecular compounds to diffuse therethrough while blocking passage of polymer particles.

The latex to be tested, having a dry material content by weight $t_1$, expressed in percentage by weight, undergoes ultrafiltration by passing through a laboratory ultrafiltration module equipped with a semi-permeable membrane marketed by Rhone Poulenc Industries in France under the trade name "Iris 3538". The ponderal dry material content is determined from the first drop of permeate collected $t_p$, expressed in percentage by weight, which equals that of the aqueous phase of the latex.

The content in the latex of hydrosoluble compounds dissolved in aqueous phase $t_s$, expressed in percentage by weight in relation to the polymer is calculated by the formula:

$$t_s = \frac{t_p(100 - t_1)}{t_1}$$

A latex usable as a binder, according to the invention, is usually obtained from a latex of a synthetic polymer which is known to be usable for the preparation of aqueous compositions for coating paper and board for printing and which is prepared by any known aqueous emulsion polymerization process, from which a sufficient quantity of the aforementioned hydrosoluble compounds are eliminated. These can be eliminated, for example, by ultrafiltration through a semi-permeable membrane. As ultrafiltration progresses, the compounds dissolved in the aqueous phase flow through the membrane in the permeate while the hydrosoluble compounds adsorbed at the surface of the latex particles are progressively desorbed and eliminated. The ultrafiltration operation can be carried out in a classical unit of a type commonly employed in industry.

A cross-section of this type of unit is shown in the attached FIGURE. Basically, it consists of tank 1 containing the latex to be processed, tank 2 containing deionized water, ultrafilter 3 and pump 4. Tank 1 is fed by tank 2 which supplies deionized water through pipe 5; and automatic valve 6, actuated by float 7, maintains constant the level of the bath contained in tank 1. Pump 4 insures latex flow through pipe 8 toward ultrafilter 3. Through pipe 9, on which flowmeter 10 is fitted, the concentrate delivered by ultrafilter 3 is recycled into tank 1. Heat exchanger fluid, circulated through coil 11 immersed in the latex contained in tank 1, maintains it at a constant temperature. Recirculating pipe 12 is used to put the unit in stable working conditions.

The unit is also equipped with shut-off valves 13, 14, 15, 16 and 17 and manometers 18 and 19.

The maintenance of stable working conditions and the operation proceed as follows: With valve 14 closed and valve 13 open, pump 4 is turned on; then valves 14 and 15 are opened and valve 13 closed. By successive approximations the opening of valves 14 and 15 is regulated so as to obtain the desired latex flow at the desired pressure, the pressure differences indicates by manometers 18 and 19, representing the pressure drop in ultrafilter 3.

To insure good operation of the ultrafiltration technique, it is advantageous, in accordance with the practice of the invention, to respect the following conditions:

The semi-permeable membrane must have a high cutoff, generally between 5,000 and 100,000, expressed as the molecular-weight-value of standard proteins in a neutral buffered medium.

The flow rate of the latex on the membrane must be higher than 0.5 m/s, and preferably between 1 and 2 m/s, to prevent the membrane from clogging at the same time it limits the pressure drop in the ultrafilter and also the shearing to which the latex is subjected.

The pressure differences on each side of the membrane must be between 0.1 and 6 bars, and preferably between 1.5 and 3 bars.

The temperature of the latex must be between 0° and 100° C., and preferably between 0° and 50° C.

Since the flow rate of the permeate decreases as the ponderal dry material content of the latex increases, it is preferable to accomplish ultrafiltration with a perceptibly constant ponderal content, generally between 5 and 70%, and preferably between 45 and 55%, possibly after dilution, especially if the latex viscosity is very high.

Unit shutdown must be followed by an adequate cleaning cycle with pure water to prevent irreversible clogging, hence destroying the membrane, If the mechanical stability of the latex is insufficient to permit ultrafiltration without forming agglomerates, one can proceed by first of all bringing the latex to an alkaline pH value of usually between 7.5 and 9.5. After ultrafiltration is completed, the latex can be concentrated, if need be, until its dry material content is suitable for the intended usage.

The following examples are provided to illustrate the invention:

EXAMPLES 1-14:

Examples 1, 3, 5, 7, 9, 11 and 13 are given for comparative purposes. Examples 2, 4, 6, 8, 10, 12 and 14 illustrate the invention.

Aqueous coating compositions are prepared and a 20 g/m² layer, expressed in dry material, of each of the aforementioned compositions is applied on a paper by means of an "air doctor" machine coater. In examples 1-6, 54 g/m² paper is used. After coating, the paper is dried in a tunnel furnace at 100° C. It then undergoes calendering which consists of four successive passes between two cylinders at a force of 80 kg/cm.

After drying and calendering, the coated paper is conditioned at 20° C. in an atmosphere at 65% relative humidity. It is then tested for dry and wet tearing-resistance by means of the following methods:

Dry tearing-resistance: This is determined with the IGT device, designed by the "Institut von Grafisch Tecknik", in which the paper is put into contact with an inking roller, the pressure of which is regulated on the paper at a chosen value and the speed of which is increased until the coated layer begins to tear. The dry tearing-resistance is determined by the value of the speed when tearing begins. "3805" ink with a graduated indicator, sold by the Lorilleux Lefranc Establishments, is used.

Wet tearing-resistance: This is also determined with the IGT device, with the difference that the inking is carried out with a sample of coated paper on which a thin water film is already deposited. Wet tearing-resistance is determined visually by comparison with other samples. "3801" ink, sold by the Lorrilleux Lefranc Establishments, is used. The results are expressed by a grade ranging from 0 to 10; 0 corresponding to a paper with very bad resistance and 10 a paper with excellent resistance. Table 1 gives, for each example, the reference of the aqueous latexes used as binders, the nature of the polymer of which they are composed, and their content of hydrosoluble compounds dissolved in the aqueous phase, in relation to the weight percent of the polymer.

TABLE 1

| | Reference | | Hydrosoluble compound content by weight in relation to the polymer (%) |
|---|---|---|---|
| Examples 1, 3 and 5 | A | Carboxyl styrene-butadiene copolymer composed of, by weight, 43% butadiene, 53% styrene and 4% ethylene carboxylic acids | 4.7 |
| Examples 2, 4 and 6 | B | Carboxyl styrene-butadiene copolymer composed of, by weight, 43% butadiene, 53% styrene and 4% ethylene carboxylic acids | 0.3 |
| Examples 7 and 9 | C | Carboxyl vinyl polyacetate composed of, by weight, 98% vinyl acetate and 2% ethylene carboxylic acids | 2.24 |
| Examples 8 and 10 | D | Carboxyl vinyl polyacetate composed of, by weight, 98% vinyl acetate and 2% ethylene carboxylic acid | 0.48 |
| Examples 11 and 13 | E | Carboxyl 2 ethylhexyl acrylate - vinyl acetate copolymer composed of, by weight, 88% vinyl acetate, 10% acrylate of 2 ethylhexyl and 2% ethylene carboxylic acid | 1.83 |
| Examples 12 and 14 | F | Carboxyl 2 ethylhexyl acrylate - vinyl acetate copolymer composed of, by weight, 88% vinyl acetate, 10% acrylate of 2 ethylhexyl and 2% ethylene carboxylic acid | 0.08 |

Latexes B, D and F, used in the examples illustrating the invention, were obtained from latexes A, C and E, respectively, used in the comparative examples, with a dry material content of 50% by weight; the latter undergoing ultrafiltration as explained below. In examples 2, 4 and 6, the ultrafiltration process is applied on the latex as is, while in examples 8, 10, 12 and 14, it is applied on the latex brought before hand to a dry material content by weight of 30% and a pH of 8 by the addition of an ammoniacal aqueous solution.

Ultrafiltration takes place in a unit with an ultrafiltration surface-area of 0.7 m$^2$. The unit is equipped with a membrane with a cutoff at 20,000, which is marketed by the Rhone Poulenc Industries of France under the trade name "Iris 3538", and is fed by a pump capable of supplying 6 m$^3$/h at a pressure of 3 bars. During ultrafiltration, the dry material content in the latex is maintained constant with deionized water.

Table 2 which follows shows the ultrafiltration time for each example according to the invention.

TABLE 2

|  | Ultrafiltration time (hours) |
|---|---|
| Examples, 2, 4 and 6 | 9 |
| Examples 8 and 10 | 8 |
| Examples 12 and 14 | 13 |

When ultrafiltration is completed, latexes D and F are concentrated to their initial dry material content of 50% by weight. After drainage, the unit is flushed clean with water. No clogging of the membrane is noticed.

Tables 3 and 4, which follow, show the nature and the weight content of the solid constituents of the coating compositions corresponding to each example. They also show the weight content in dry material to which are adjusted the coating compositions brought to a pH of 8.5 by the addition of ammonia.

TABLE 3

| Example | 1 | 2 | 3 | 4 | 5 | 6 |
|---|---|---|---|---|---|---|
| Kaolin | 100 | 100 | 100 | 100 | 100 | 100 |
| Sodium hexametaphosphate | 0.3 | 0.3 | 0.3 | 0.3 | 0.3 | 0.3 |
| Carboxymethylcellulose | 0.3 | 0.3 | — | — | — | — |
| Starch | — | — | 6 | 6 | — | — |
| Polyvinyl alcohol | — | — | — | — | 2 | 2 |
| Latex A | 12 | — | 8 | — | 10 | — |
| Latex B | — | 12 | — | 8 | — | 10 |
| Ponderal content in dry material (%) | 48 | 48 | 48 | 48 | 52 | 52 |

TABLE 4

| Example | 7 | 8 | 9 | 10 | 11 | 12 | 13 | 14 |
|---|---|---|---|---|---|---|---|---|
| Kaolin | 100 | 100 | 100 | 100 | 100 | 100 | 100 | 100 |
| Sodium pyrophosphate | 0.4 | 0.4 | 0.4 | 0.4 | 0.4 | 0.4 | 0.4 | 0.4 |
| Polyvinyl alcohol | 1 | 1 | 2 | 2 | 1 | 1 | 2 | 2 |
| Latex C | 12 | | 10 | | | | | |
| Latex D | | 12 | | 10 | | | | |
| Latex E | | | | | 12 | | 10 | |
| Latex F | | | | | | 12 | | 10 |
| Ponderal content in dry material (%) | 50 | 50 | 50 | 50 | 50 | 50 | 50 | 50 |

Tables 5 and 6, which follow, show the results obtained for each example.

TABLE 5

| Example | 1 | 2 | 3 | 4 | 5 | 6 |
|---|---|---|---|---|---|---|
| Dry tearing-resistance (cm/s) | 67 | 71 | 50 | 61 | 62 | 63 |
| Wet tearing-resistance | 4 | 7 | 4 | 6 | 5 | 6 |

TABLE 6

| Example | 7 | 8 | 9 | 10 | 11 | 12 | 13 | 14 |
|---|---|---|---|---|---|---|---|---|
| Dry tearing-resistance (cm/s) | 42 | 43 | 42 | 43 | 42 | 45 | 52 | 53 |
| Wet tearing-resistance | 3 | 5.5 | 5 | 6 | 5.5 | 7 | 8 | 9 |

It can be seen that latexes B, D and F, used as binders in the invention, lead to coated paper, the dry and wet tearing-resistances of which are superior to paper coated with aqueous compositions containing latexes A, C and E.

We claim:

1. Process for the manufacture of printing paper and board having increased wet tear strength and dry tear strength comprising coating the paper or board on one surface with a coating composition containing as a binder an aqueous latex of a synthetic polymer characterized by the fact that the content in the latex of hydrosoluble compounds dissolved in the aqueous phase is less than 0.5% by weight in relation to the polymer, said synthetic polymer being selected from the group consisting of styrene-butadiene copolymers, carboxyl styrene-butadiene copolymers, vinyl polyacetates, carboxyl vinyl polyacetates, alkyl acrylate-vinyl acetate copolymers, and carboxyl alkyl acrylate-vinyl acetate copolymers.

2. Process as claimed in claim 1, in which hydrosoluble compounds are removed from a latex obtained of a synthetic polymer prepared by emulsion polymerization.

3. Process as claimed in claim 2, in which the aforementioned hydrosoluble compounds are eliminated by ultrafiltration through a semi-permeable membrane while the total solids content of the latex is maintained within the range of 5–70% by weight.

4. Process as claimed in claim 3, in which membrane cutoff is between 5000 and 100,000, expressed in molecular-weight-value of standard proteins in a neutral, buffered medium.

5. Process as claimed in claim 3, in which when ultrafiltration is completed, the latex is concentrated until its content in dry material is suitable for the intended usage.

* * * * *